F. G. RENAUD.
FOOD RECEPTACLE.
APPLICATION FILED MAY 1, 1911.
1,015,400.
Patented Jan. 23, 1912.
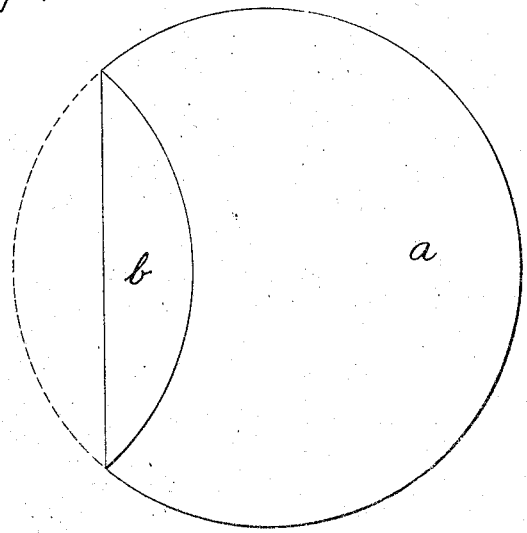
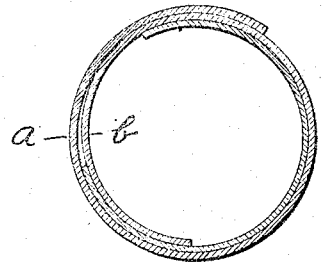
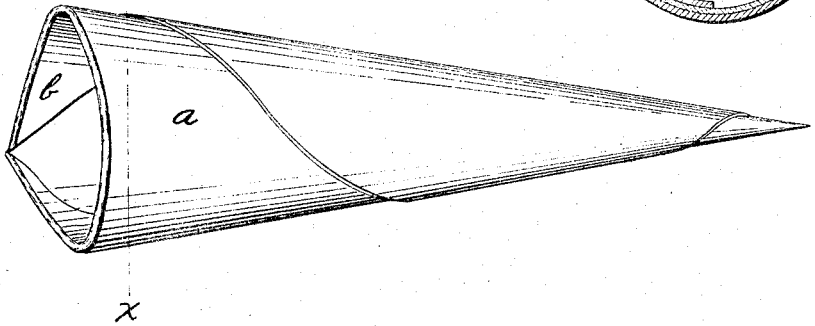
WITNESSES
Chas. E. Skelton
E. J. Staub
INVENTOR
Frank G. Renaud
BY Howard P. Denison
ATTY.

UNITED STATES PATENT OFFICE.

FRANK G. RENAUD, OF SYRACUSE, NEW YORK.

FOOD-RECEPTACLE.

1,015,400. Specification of Letters Patent. Patented Jan. 23, 1912.

Application filed May 1, 1911. Serial No. 624,430.

*To all whom it may concern:*

Be it known that I, FRANK G. RENAUD, of Syracuse, in the county of Onondaga, in the State of New York, have invented new and useful Improvements in Food-Receptacles, of which the following, taken in connection with the accompanying drawings, is a full, clear, and exact description.

This invention relates to food receptacles or light food carrying cones, which are formed of some edible material. For some time past there has been a demand for a light food carrying receptacle or cone and in fact such devices have been extensively upon the market.

The device to which I refer is of the usual cone shape and is made of either paper, and some times of a food material, and are principally used as ice cream cones. A particular advantage in using such a cone made of food material is that it is more apt to be pure and clean than when made of a piece of paper. I have found, however, that when such receptacles are made of a food material the edges are necessarily thin and easily chip off and allow the contents to run out.

My object, therefore, is to construct an ice cream cone of a food material and form it into shape while partially baked and then allow it to become hard and also providing its upper end with an inturned edge so as to add strength to it and obviate its brittleness.

To that end my invention consists in several new and novel features of construction hereinafter described and specifically set forth in the claims hereunto annexed. It is formed as follows, reference being had to the accompanying drawings in which—

Figure 1 shows a plan view of the blank which has been partially baked and shows the blank as it appears upon the baking pan, and shows a segment of the periphery in dotted lines turned over upon the body prior to being formed into cone shape as shown in Fig. 2. Fig. 2 is a view of the complete cone. Fig. 3 is a section from the upper end of the cone and from the folded in edge. Fig. 4 is a vertical section through the larger end showing the double edge.

Similar letters of reference indicate corresponding parts in all of the drawings which form a part of this specification.

The blank or body —a— is first made by pouring a batter of some edible material, preferably containing corn starch upon a hot griddle and when the same is partially baked one edge thereof, as shown at —b—, is turned over as shown in Fig. 1 and while still hot the blank is wound upon a cone-shaped form thereby taking the form, as shown in Fig. 2 and allowed to cool. In winding the blank upon the form it will be observed that the folded over portion —b— forms a double upper edge, as shown in Figs. 2 and 3 and 4. The cone being formed from the blank while yet warm will retain its shape immediately it becomes cool.

I do not limit myself to a cone made of edible material, having a double edge, although that is preferable, nor do I limit myself to any particular form of receptacle, but desire to claim broadly a receptacle of the class described, having a double upper edge for the purposes specified.

What I claim is:

1. A food receptacle formed of an edible material having its upper end folded in to form a double edge for the purposes specified.

2. A food receptacle formed of a blank of an edible material having one edge folded over on itself and then formed into a conical shape having a double edge opening.

3. A food receptacle formed of a blank of some edible material having one edge folded over on itself and then formed into a conical shape having a double edge opening.

4. A food receptacle having its upper end folded to form a double edge and its lower end wound spirally to form a closed end.

5. A food receptacle formed of a blank of an edible material having one edge folded over on itself and then formed into a conical shape having a double edge opening, and having its lower end closed.

In witness whereof I have hereunto set my hand on this 19th day of April 1911.

FRANK G. RENAUD.

Witnesses:
EMILY F. SPEARING,
HOWARD P. DENISON.